(12) United States Patent
Palvadi et al.

(10) Patent No.: US 8,981,248 B2
(45) Date of Patent: Mar. 17, 2015

(54) ARC MITIGATION ASSEMBLY AND METHOD OF ASSEMBLY TO AVOID GROUND STRIKE

(71) Applicant: General Electric Company, Schenectady, NY (US)

(72) Inventors: Srinivas Naga Palvadi, Secunderabad (IN); Sudhakar Sambaiah Pachunoori, Hyderabad (IN); Ravi Kumar, Secunderabad (IN)

(73) Assignee: General Electric Company, Schenectady, NY (US)

( * ) Notice: Subject to any disclaimer, the term of this patent is extended or adjusted under 35 U.S.C. 154(b) by 164 days.

(21) Appl. No.: 13/707,822

(22) Filed: Dec. 7, 2012

(65) Prior Publication Data

US 2014/0158666 A1 Jun. 12, 2014

(51) Int. Cl.

| | |
|---|---|
| H01H 3/60 | (2006.01) |
| H01H 77/00 | (2006.01) |
| H01H 75/00 | (2006.01) |
| H02H 3/00 | (2006.01) |
| H02H 9/00 | (2006.01) |
| H01H 9/38 | (2006.01) |
| H01H 9/50 | (2006.01) |
| H01H 33/10 | (2006.01) |
| H01H 33/26 | (2006.01) |
| H01T 1/15 | (2006.01) |
| H02H 1/00 | (2006.01) |
| H01T 2/02 | (2006.01) |

(52) U.S. Cl.
CPC . *H01H 9/38* (2013.01); *H01H 9/50* (2013.01); *H01H 33/10* (2013.01); *H01H 33/26* (2013.01); *H01T 1/15* (2013.01); *H02H 1/0023* (2013.01); *H01T 2/02* (2013.01)

USPC ............. 218/157; 218/155; 218/156; 361/2; 361/54

(58) Field of Classification Search
USPC ............. 218/156, 157; 219/121.43; 250/310; 313/231, 231.41; 427/534; 438/719
See application file for complete search history.

(56) References Cited

U.S. PATENT DOCUMENTS

| | | | |
|---|---|---|---|
| 4,689,717 | A | 8/1987 | Munzinger et al. |
| 5,403,983 | A | 4/1995 | Luoma |
| 7,253,379 | B2 | 8/2007 | Lakner et al. |
| 7,529,073 | B2 | 5/2009 | Cern |
| 7,683,795 | B2 | 3/2010 | Bjorn |

(Continued)

*Primary Examiner* — Renee S Luebke
*Assistant Examiner* — William Bolton
(74) *Attorney, Agent, or Firm* — General Electric Company

(57) ABSTRACT

A circuit protection device is provided for use with a circuit that includes at least one pair of conductors. The protection device is configured to generate an arc. The protection device includes at least a pair of electrode assemblies electrically coupled to the at least one pair of conductors and a conductor base to support the pair of electrode assemblies. The protection device includes a cover coupled to the conductor base and defining at least one isolation chamber, wherein the electrode assemblies are disposed within the isolation chamber. The protection device includes a containment shield moveably coupled to the cover. The containment shield defines a containment chamber configured to contain charged particles produced by the arc. The containment shield is operative to move relative to the cover in response to a change in pressure produced by the arc within the containment chamber. An isolation assembly is coupled to at least one of the cover and the containment shield and configured to prevent the cover from contacting the containment shield.

20 Claims, 5 Drawing Sheets

(56) References Cited

U.S. PATENT DOCUMENTS

| | | |
|---|---|---|
| 7,724,489 B2 | 5/2010 | Montich |
| 7,901,227 B2 | 3/2011 | Hughes |
| 7,911,747 B2 | 3/2011 | Hyde et al. |
| 8,278,811 B2 * | 10/2012 | Engel et al. ............... 313/231.41 |
| 8,563,888 B2 * | 10/2013 | Bohori et al. ................. 218/157 |
| 2009/0120773 A1 | 5/2009 | Gentsch et al. |
| 2010/0006544 A1 | 1/2010 | Onufriyenko et al. |
| 2012/0063036 A1 * | 3/2012 | Robarge et al. .................... 361/2 |
| 2012/0068602 A1 * | 3/2012 | Roscoe et al. ........... 315/111.21 |
| 2013/0329325 A1 * | 12/2013 | Ganireddy et al. ............. 361/56 |

* cited by examiner

ARC MITIGATION ASSEMBLY AND METHOD OF ASSEMBLY TO AVOID GROUND STRIKE

BACKGROUND

The embodiments described herein relate generally to power equipment protection devices and, more particularly, to arc mitigation systems, apparatus, and methods of assembly for channeling exhaust gases and pressure away from a location of arc generation, and limiting ground strike in the system.

Known electric power circuits and switchgear generally have conductors that are separated by a distance with insulation, such as air, or gas or solid dielectrics. However, if the conductors are positioned too closely together, or if a voltage between the conductors exceeds the dielectric strength of the insulation between the conductors, an arc flash can occur. Arc flash also can occur in case of aging insulations, rodents, and improper maintenance procedures. The insulation between the conductors can become ionized, which makes the insulation conductive and enables arc formation.

An arc flash causes rapid release of energy due to a fault between phase conductors, between a phase conductor and a neutral conductor, or between a phase conductor and a ground point. Arc flash temperatures can reach or exceed 20,000° C., which can vaporize the conductors and burn through the sheets of adjacent equipment panels. In addition, an arc fault is associated with release significant amount of energy in the form of heat, intense light, pressure waves, and/or sound waves due to which heavy damage to the conductors and adjacent equipment can occur. In general fault current associated with an arc event and the energy associated with arc event are lower compared to the fault current and energy associated with bolted short circuit fault. Due to inherent delay between the relay closure and the circuit breaker clearing the fault, huge damage can occur at fault location. Circuit breaker can be operated using the faster tripping mechanism to reduce the damage. Even with this feature the damage cannot be minimized.

At least some known systems use an arc mitigation system to safely divert energy from the location of an arc flash. The arc mitigation system has a containment device/chamber that often includes electrodes or conductors that are separated by a distance and have a sufficient dielectric strength between them to not to cause arc flash without external aid. A plasma generating device is included within the arc containment chamber. When the arc flash event is detected, the plasma device emits ablative plasma towards the electrodes. The ablative plasma reduces electrical impedance between the electrodes, and an electrical arc may be formed between the electrodes. The electrical arc diverts energy from the first arc flash zone to the arc chamber until the arc flash is abated or extinguished. In order to safely transfer energy away from the electrical arc, the arc containment device should not pass excessive current in the ground path. The deposition of charged particles from the arc event on the grounded parts generally causes the current flow through ground path. To avoid excessive current flow through ground, additional components such as charge collectors and/or a coating such as epoxy and/or ceramic are used which make the production process complex and also increases the cost.

BRIEF DESCRIPTION

In one aspect a circuit protection device for use with a circuit that includes at least one pair of conductors is described. The circuit protection device is configured to generate an arc. The circuit protection device includes at least one pair of electrode assemblies, a conductor base configured to support the electrode assemblies thereon, a cover coupled to the conductor base and defining at least one isolation chamber, a containment shield moveably coupled to the cover within the isolation chamber, and an isolation assembly coupled to at least one of the cover and the containment shield. A first electrode assembly of the pair of electrode assemblies is electrically coupled to a first conductor of the at least one pair of conductors, and a second electrode assembly of the pair of electrode assemblies electrically coupled to a second conductor of the at least one pair of conductors. The at least one pair of electrode assemblies is disposed within the at least one isolation chamber. The containment shield defines a containment chamber configured to contain charged particles produced by the arc. The containment shield is operative to move relative to the cover in response to a change in pressure produced by the arc within the containment chamber. The isolation assembly is configured to prevent the cover from contacting the containment shield.

Another aspect of present disclosure is an electrical isolation structure for use with a circuit protection device that includes a plurality of electrode assemblies. Each electrode assembly of the plurality of electrode assemblies has an electrode coupled to an electrode holder. The electrical isolation structure includes a conductor base, a cover coupled to the conductor base, a containment shield coupled to the cover and defining a containment chamber, and an isolation assembly coupled to at least one of the cover and the containment shield. The containment shield is disposed within the cover and configured to move away from the conductor base in response to a change in pressure produced by an arc within the containment chamber. The isolation assembly is configured to prevent said cover from contacting the containment shield.

Yet another aspect is a method of assembling a circuit protection device for use with a circuit that includes a pair of conductors. The circuit protection device includes a conductor base, a containment shield defining a containment chamber, a cover, a plasma generating device, and a pair of electrode assemblies each having an electrode secured thereto. The method includes securing the pair of electrode assemblies to the conductor base, coupling the containment shield to the cover with an isolation assembly between the containment shield and the cover such that the containment shield is moveable towards and away from a top of the cover, coupling the cover to the conductor base such that the pair of electrode assemblies is disposed within the containment chamber, and electrically coupling the pair of electrode assemblies to the pair of conductors.

DETAILED DESCRIPTION

Exemplary embodiments of systems and apparatus for use with a circuit protection system are described herein. These embodiments enhance the flow of exhaust gases, heat, and pressure out of the circuit protection system after an arc is generated. For example, the circuit protection system receives a signal that indicates detection of a primary arc flash within a power system coupled to the circuit protection system. The circuit protection system generates a secondary arc to transfer the energy generated by the primary arc flash away from the power system. The embodiments described herein utilize the presence of exhaust gases created by the arc flash to trigger the routing of energy created by the arc flash out of an equipment enclosure without causing the flow of current through a ground fuse, which protects the circuit protection system and any other electrical equipment positioned within the equipment enclosure from the ground fault.

Figure 1:
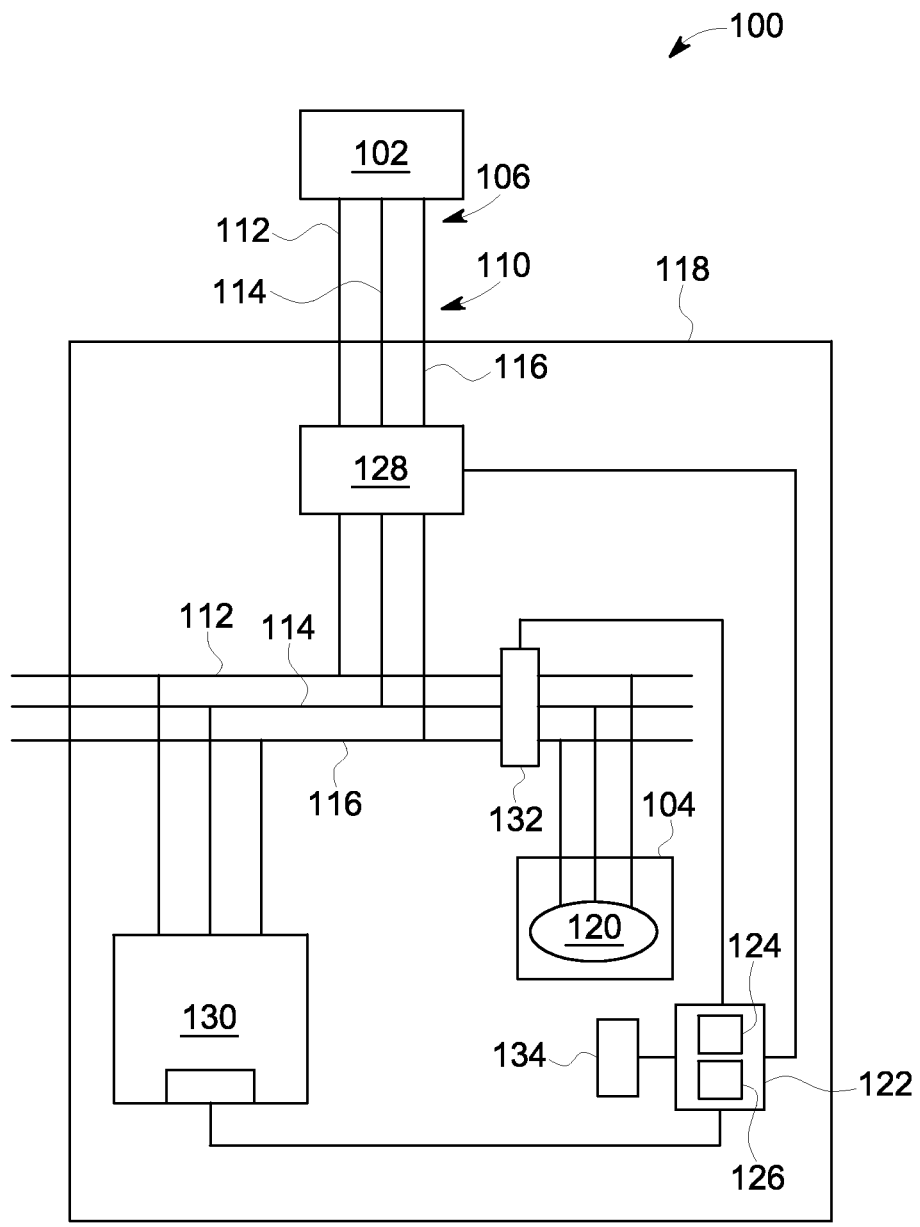
FIG. 1 is a schematic block diagram of an exemplary power distribution system that may be used to distribute electrical power (i.e., electrical current and voltage) received from an electrical power source to one or more loads.

FIG. 1 is a schematic block diagram of an exemplary power distribution system 100 that may be used to distribute electrical power (i.e., electrical current and voltage) received from an electrical power source 102 to one or more loads 104. Power distribution system 100 includes a plurality of electrical distribution lines 106 that receive current, such as three phase alternating current (AC), from electrical power source 102. Alternatively, power distribution system 100 may receive any number of phases of current through any suitable number of electrical distribution lines 106 that enables power distribution system 100 to function as described herein.

Electrical power source 102 includes, for example, an electrical power distribution network, or "grid," a steam turbine generator, a gas turbine generator, a wind turbine generator, a hydroelectric generator, a solar panel array, and/or any other device or system that generates electrical power. Loads 104 include, for example, machinery, motors, lighting, and/or other electrical and electromechanical equipment of a manufacturing, power generation, or distribution facility.

Electrical distribution lines 106 are arranged as a plurality of conductors 110. In an exemplary embodiment, conductors 110 include a first phase conductor 112, a second phase conductor 114, and a third phase conductor 116. First phase conductor 112, second phase conductor 114, and third phase conductor 116 are coupled to an equipment protection system 118 for transmitting a first phase of current, a second phase of current, and a third phase of current, respectively, to equipment protection system 118.

In an exemplary embodiment, equipment protection system 118 is a switchgear unit that protects power distribution system 100 and/or loads 104 from an electrical fault that may occur within power distribution system 100. More specifically, equipment protection system 118 electrically disconnects loads 104 from electrical distribution lines 106 (and from electrical power source 102) to interrupt current if an arc flash event 120 is detected. Alternatively, equipment protection system 118 is any other protection system that enables power distribution system 100 to selectively prevent electrical current from flowing to loads 104.

As used herein, an "arc flash event" refers to a rapid release of energy due to a fault between two electrical conductors. The rapid release of energy may cause pressure waves, shock waves, excess temperature, metal shrapnel, acoustic waves, gasses, and/or light (collectively referred to sometimes herein as "arc products") to be generated proximate the fault, for example, within equipment protection system 118 and/or power distribution system 100.

In an exemplary embodiment, equipment protection system 118 includes a controller 122 that includes a processor 124 and a memory 126 coupled to processor 124. Processor 124 controls and/or monitors operation of equipment protection system 118. Alternatively, equipment protection system 118 includes any other suitable circuit or device for controlling and/or monitoring operation of equipment protection system 118.

It should be understood that the term "processor" refers generally to any programmable system including systems and microcontrollers, reduced instruction set circuits (RISC), application specific integrated circuits (ASIC), programmable logic circuits, and any other circuit or processor capable of executing the functions described herein. The above examples are exemplary only, and thus are not intended to limit in any way the definition and/or meaning of the term "processor."

Equipment protection system 118 includes a circuit interruption device 128 coupled to first phase conductor 112, second phase conductor 114, and third phase conductor 116. Circuit interruption device 128 is controlled or activated by controller 122 to interrupt current flowing through first phase conductor 112, second phase conductor 114, and third phase conductor 116. In an exemplary embodiment, circuit interruption device 128 includes a circuit breaker, contactor, switch, and/or any other device that enables current to be controllably interrupted by controller 122.

An arc mitigation system 130, also sometimes referred to as an electrical fault mitigation system 130 or a circuit protection device 130, is coupled to circuit interruption device 128 by first phase conductor 112, second phase conductor 114, and third phase conductor 116. In addition, controller 122 is communicatively coupled to arc mitigation system 130.

In an exemplary embodiment, equipment protection system 118 also includes at least one first, or current, sensor 132 and at least one second or additional sensors 134 such as optical, acoustic, voltage, pressure etc. Current sensor 132 is coupled to, or positioned about, first phase conductor 112, second phase conductor 114, and third phase conductor 116 for measuring and/or detecting the current flowing through conductors 112, 114, and 116. Alternatively, a separate current sensor 132 is coupled to, or positioned about, each of first phase conductor 112, second phase conductor 114, and third phase conductor 116 for measuring and/or detecting the current flowing therethrough. In an exemplary embodiment, current sensor 132 is a current transformer, a Rogowski coil, a Hall-effect sensor, and/or a shunt. Alternatively, current sensor 132 may include any other sensor that enables equipment protection system 118 to function as described herein. In an exemplary embodiment, each current sensor 132 generates one or more signals representative of the measured or detected current (hereinafter referred to as "current signals") flowing through first phase conductor 112, second phase conductor 114, and/or third phase conductor 116, and transmits the current signals to controller 122.

Additional sensor 134, in an exemplary embodiment, measures and/or detects an event of arc flash by, for example, measuring or detecting an amount of light generated, an acoustic pressure generated, a reduction in the voltage of the system, a barometric pressure on one or more predefined planes, an/or a displacement of a cover protection system 118 within equipment protection system 118 generated by arc flash event 120. Additional sensor 134 generates one or more signals representative of the measured or detected quantity (sometimes hereinafter referred to as "sensor signals") and transmits the sensor signals to controller 122.

Controller 122 analyzes the current signals and the signal from the additional sensor 134 to determine and/or detect whether arc flash event 120 has occurred. More specifically, controller 122 compares the additional signals to one or more rules or thresholds to determine whether the additional signals contain indicators of arc flash event 120. If controller 122 determines that arc flash event 120 has occurred based on the additional signals, controller 122 transmits a trip signal to circuit interruption device 128, and transmits an activation signal to arc mitigation system 130. Circuit interruption device 128 interrupts current flowing through first phase conductor 112, second phase conductor 114, and third phase conductor 116 in response to the trip signal. Arc mitigation system 130 diverts and/or discharges energy from arc flash event 120 into arc mitigation system 130, as is described more fully herein.

Figure 2:
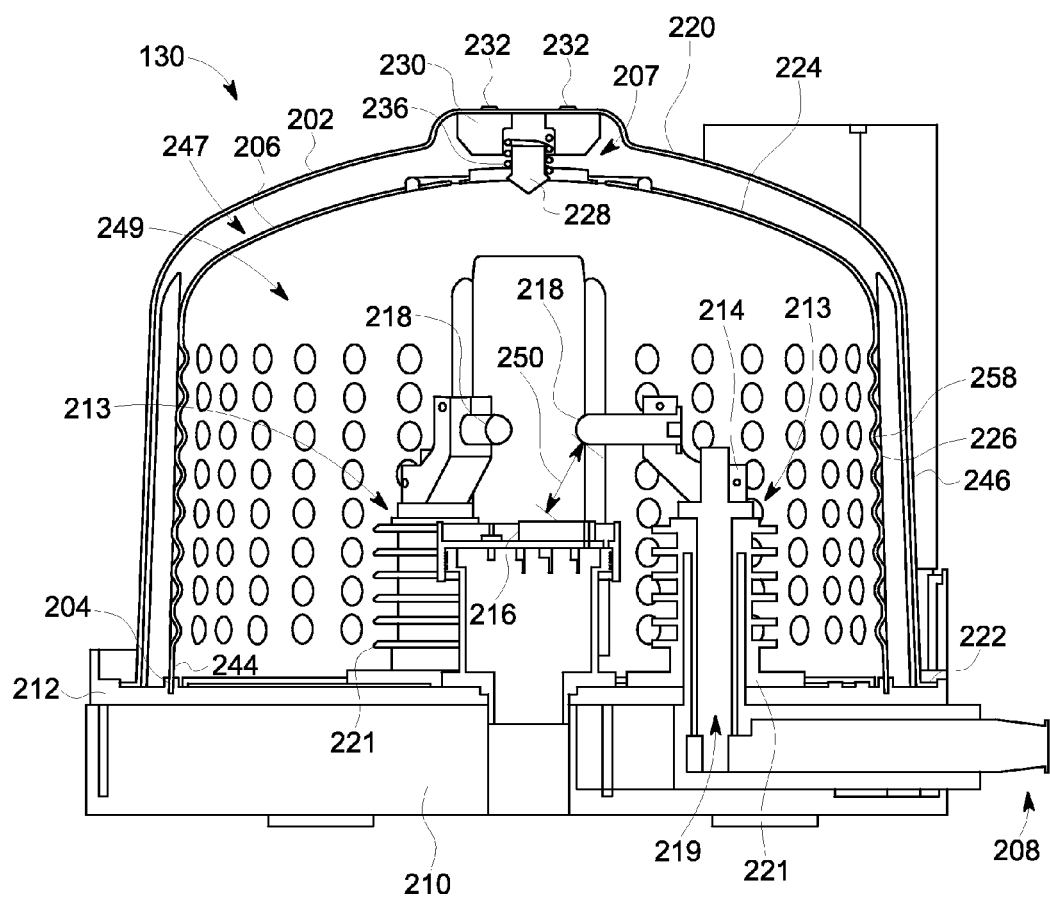
FIG. 2 is a cross-section schematic diagram of an arc mitigation system to be used with the power distribution system of FIG. 1.
Figure 3:
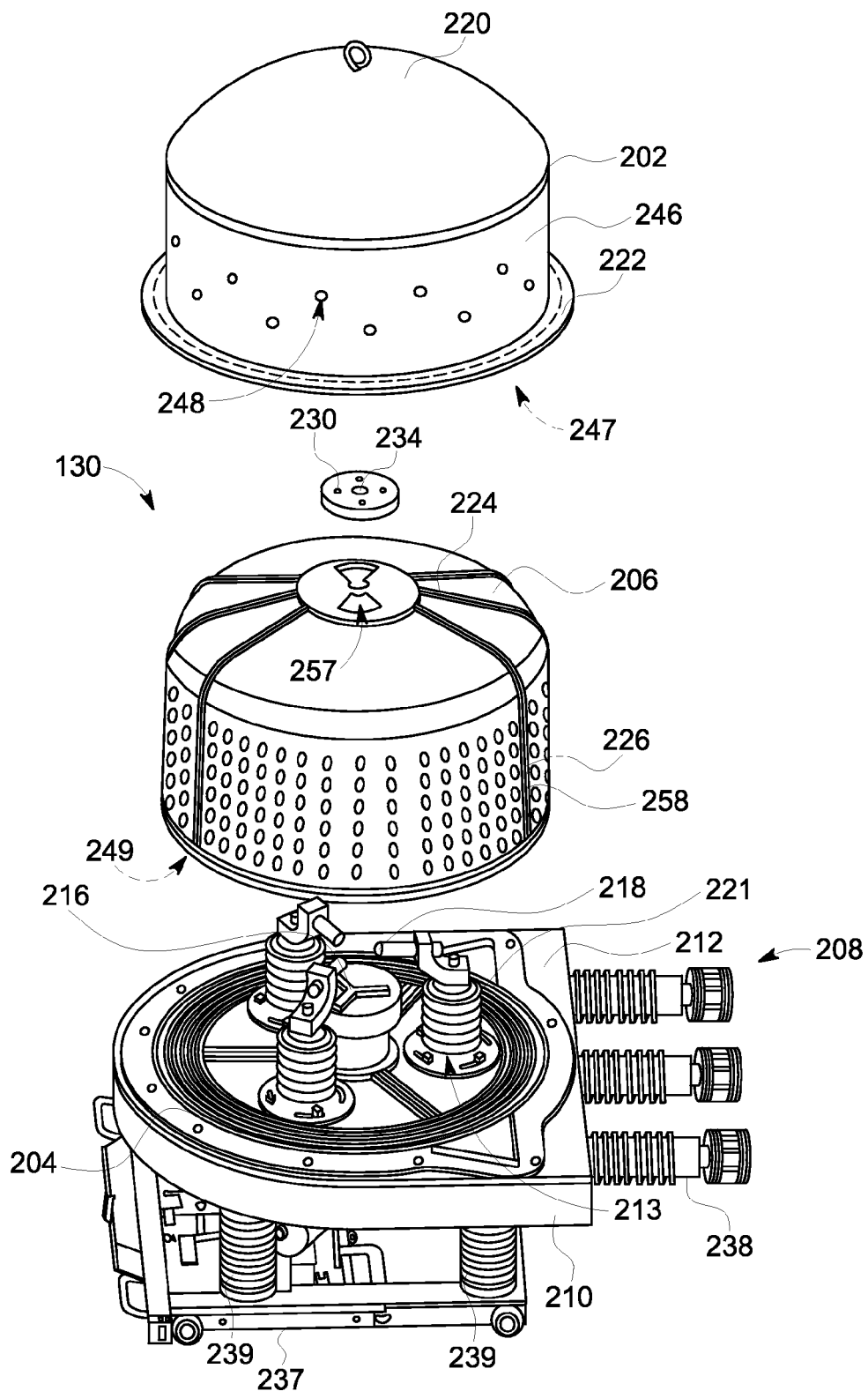
FIG. 3 is a perspective schematic diagram of an exemplary arc mitigation system shown in FIG. 2.
Figure 4:
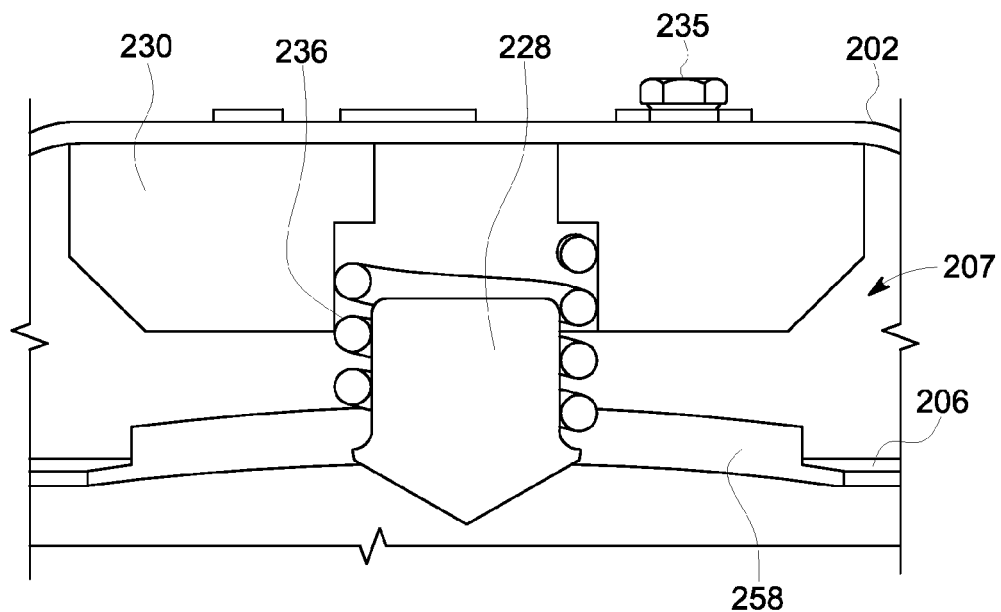
FIG. 4 is an enlarged cross-section of the insulator disk of the arc mitigation system shown in FIG. 2.

FIG. 2 is a cross-section schematic diagram of arc mitigation system 130 and FIG. 3 is a perspective schematic diagram of an exemplary arc mitigation system 130. FIG. 4 is an enlarged view of section A (shown in FIG. 2) of arc mitigation system 130 and FIG. 5 is an enlarged view of section B (shown in FIG. 2) of arc mitigation system 130.

In an exemplary embodiment, arc mitigation system 130 includes a cover 202 (shown in FIG. 2), a shock shield 206 (also referred to as a containment shell or containment shield) (shown in FIGS. 2-5), an isolation assembly 207 (shown in FIGS. 2 and 4), and a conductor assembly 208 (shown in FIGS. 2 and 3).

Figure 5:
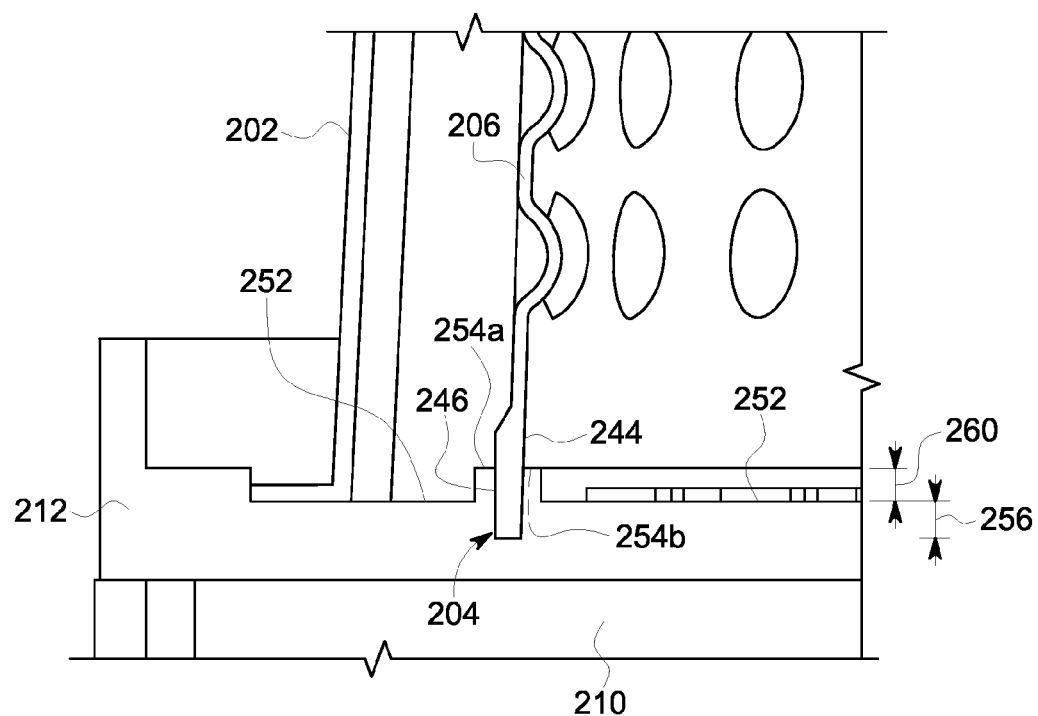
FIG. 5 is an enlarged cross-section of the interface of the inner shield with the top surface of the cover of the arc mitigation system shown in FIG. 2.

As shown in FIGS. 2 and 5, conductor assembly 208 includes a conductor base 210 and a conductor cover 212 with a plurality of electrical conductors (not shown) positioned therebetween. Each electrical conductor is coupled to an electrode assembly 213. In the exemplary implementation, system 130 includes a pair of electrode assemblies 213 and a pair of electrical conductors, each electrode assembly 213 is coupled to a different conductor of the pair electrical conductors. More specifically, a first electrode assembly 213 of the pair of electrode assemblies 213 is coupled to a first conductor of the pair of electrical conductors and a second electrode assembly 213 of the pair of electrode assemblies 213 is coupled to a second conductor of the pair of electrical conductors. Other embodiments may include more or fewer electrode assemblies 213 and more or fewer conductors. Electrode assembly 213 includes an arc source electrode 218 and an electrode support 214. Electrode support 214 has an internal conductor 219. The arc source electrode 218 is mounted rigidly on to the internal conductor 219 of the electrode support 214. Outer body 221 of electrode support 214 is made up of insulating material (shown in FIG. 2). Each electrode support 214 is rigidly mounted onto conductor cover 212. The arc source electrodes 218 are spaced apart to define an electrode gap 250 between arc source electrodes 218. Each electrical conductor (not shown) extends through conductor base 210 to connect electrodes 218 to a power source (not shown), such as a power bus. Conductor base 210 and conductor cover 212 may be made of any suitable electrically insulating material and composites to provide an electrically insulative support for electrodes 218.

An arc triggering device, such as a plasma generating device 216, is disposed proximate the gap. For example, plasma generating device 216 may be centrally disposed with respect to arc source electrodes 218, and is configured to ionize a full or portion of the space in the gap. In one embodiment, plasma generating device 216 injects plasma as an arc creation technique, to create a secondary arcing fault in response to a signal indicative of a primary arc flash within the power system coupled to arc mitigation system 130. In operation, arc source electrodes 218 generate an arc, such as a secondary arc flash, for use in dissipating energy associated with a primary arc flash detected on a circuit, thus producing exhaust gases, heat, and pressure within arc mitigation system 130. Erosion of electrodes 218 during creation of the arc creates charged particles that may come into contact with shock shield 206.

Cover 202 includes a top 220, a lip and/or flat surface 222, and a side 246 extending between top 202 and lip 222. Lip 222 includes a plurality of mounting apertures (not shown) that are sized to receive a respective fastening mechanism (not shown), such as a threaded bolt, therein to couple to conductor cover 212. Top 220 and side 246 generally define an isolation chamber 247 within which electrode assemblies 213 are disposed. Cover 202 is sized to cover shock shield 206 and enclose shock shield 206 within isolation chamber 247. As shown in FIG. 3, cover 202 also has openings 248, also referred to as vent holes 248, for venting out arc effluents caused by the arc event in the arc containment device 130. In the illustrated embodiment, vent holes 248 are located on side 226 of cover 202. In other embodiments, vent holes 248 are located on top 220 of cover 202. Some embodiments include more or fewer vent holes 248 and/or differently located vent holes 248. In the illustrated embodiment, the arc effluents are permitted to exit device 118 directly through vent holes 248. In other embodiments, the exhaust exiting vent holes 248 may be captured and exhausted by a chimney (not shown) coupled to cover 202.

As shown in FIGS. 2 and 3, shock shield 206 is sized to cover electrodes 218, and is disposed over electrodes 218 within isolation chamber 247. Shock shield 206 includes a top 224 and a side 226 that generally define a containment chamber 249 within isolation chamber 247. Electrode assemblies 213 are generally disposed within the containment chamber 249 such that the secondary arc source created by plasma generating device 216 and electrodes 218 is either contained or partially contained within containment chamber 249 by shock shield 206. Moreover, charged particles and other arc products, such as high intensity pressure waves, high temperatures, metal shrapnel, gases, and/or light, are contained or partially contained within containment chamber 249. A plurality of exhaust vents 257 are formed in top 224. Side 226 of shock shield 206 has a plurality of structural formations 258, such as bubbles, dimples, aberrations etc., to diffuse the reflections from the shock pressure generated by an arc event and/or reduce a shock pressure wave within containment chamber 249 generated by an arc event.

Isolation assembly 207 is positioned between cover 202 and shock shield 206. In the exemplary implementation, isolation assembly is coupled to cover 202 and shock shield 206. In other implementations, isolation assembly may be coupled to only one of cover 202 and shock shield 206. Isolation assembly 207 prevents direct contact and electrical coupling between cover 202 and shock shield 206. Charged particles generated within the containment chamber during the secondary arc event are thereby prevented from coupling to cover 202. Isolation assembly 207 includes an alignment post 228 (FIGS. 2 and 4) located in the center of cover 202 and coupled to shock shield 206. An insulator disk 230 is mounted to the center of top 220 with a plurality of fastening mechanisms 232. Insulator disk 230 is constructed of an electrically insulative material and contains an aperture 234 sized to receive alignment post 228, thereby enabling the slidable coupling of shock shield 206 to cover 202. Thus, shock shield 206 is operative to move relative to cover 202 in response to changes in pressure produced by an arc within the containment chamber. A flexible component 236 surrounds alignment post 228 and biases shock shield 206 in a direction away from top 220 of cover 202. In the example embodiment flexible component 236 is a spring 236. In other embodiments, flexible component 236 may be any other suitable flexible component. In the event that an opposing and stronger force is applied to shock shield 206 and associated spring 236, shock shield 206 and attached alignment post 228 slide parallel with the alignment post such that alignment post 228 remains within aperture 234 as shock shield 206 moves away from conductor base 210 and toward cover 202.

Insulator disk 230 houses alignment post 228 and spring 236 and acts as a guide for movement of shock shield 206 during an arc event. Insulator disk 230 prevents contact between shock shield 206 and conductor cover 212. Ground strike current is eliminated by avoiding contact between shock shield 206 and cover 202. Additionally, arc mitigation system 130 is mounted on top of a movable mounting platform 237 using insulators 239. In use, arc mitigation system 130 may be mounted in an equipment cabinet or rack (not shown). Moveable mounting platform 237 permits arc mitigation system 237 to be moved relative to the rack on which it is mounted. In an installed/in use position relative to the rack, arc mitigation system 130 may be at least partially enclosed and inaccessible. Moveable mounting platform 237 permits arc mitigation system 130 to be moved out of the rack to a position permitting access to arc mitigation system 230 without disconnecting arc mitigation system 130 from the rack. Movable mounting platform 237 is at ground potential. Insulators 239 are selected for the system dielectric requirements. This arrangement breaks the grounding path from arc mitigation system 130 to the rack due to insulators 239. The over surface path length from cover 202 mounting location to insulators 239 enhances the dielectric strength of the device and avoids the formation of ground path due to creepage. By preventing mounting platform 237 from being electrically coupled to arc mitigation system 130, the grounding path of device 130 can be avoided and/or controlled, and operators coming in contact with mounting platform 237 during an arc flash event are protected from the high current of the arc. The mounting mechanism on insulators 239 and insulator disc mechanism 230 may prevent any occurrence of a ground strike fault during an arc flash.

An annular groove 204 is defined in a portion of conductor cover 212. Annular groove 204 extends from an upper surface 252 of conductor cover 212 toward conductor base 210 within conductor cover 212. In the exemplary embodiment, groove 204 has a depth of approximately 0.5 inches. In the exemplary embodiment, groove 204 extends towards a portion of conductor cover 212 that is positioned a predetermined distance 256 from conductor base 210. Also, groove 204 is partially defined by two spaced apart projections 254a and 254b that extend away from surface 252 a distance 260. Distance 256 and distance 260 can have any value. Groove 204 is configured to receive bottom portion 244 of side surface 226 of shock shield 206, such that flue gases cannot escape when shock shield 206 is biased in the direction opposite cover top 220. When the pressure created by flue gases within shock shield 206 is sufficient to cause shock shield 206 to slide parallel with the alignment post in a direction opposite conductor cover 212, shock shield side 226 remains within groove 204 such that flue gases within shock shield 206 shield remain unable to escape between bottom portion 244 of side surface 226 and groove 204. When shock shield 206 slides in the direction opposite conductor cover 212 such that shock shield top 224 contacts cover top 220 (which is grounded), the arc contained by shock shield 206 travels through shock shield top 224 and to ground. This configuration contains energy from the arc inside shock shield 206 and containment device 130.

During operation, controller 122 (shown in FIG. 1) analyzes the current signals and the signals from the additional sensor 134 to determine and/or detect whether arc flash event 120 has occurred. In response to the detection, controller 122 (shown in FIG. 1) causes plasma generating device 216 (shown in FIG. 2) to emit a fume of an ablative plasma. Specifically, plasma generating device 216 emits the plasma into gap 284 (shown in FIG. 2) defined between arc source electrodes 218 (shown in FIG. 2). The plasma lowers an impedance between the tips of electrodes 218 to enable formation of a secondary arc flash. The secondary arc flash releases energy including metal shrapnel, heat, pressure, light, and/or sound.

The secondary arc flash can create current due to charge deposition from exhaust gases. The exhaust gases are retained, or partially retained, by shock shield 206 causing it to move in a direction opposite conductor cover 212 due to the accumulation of gases. The charged particles from the plasma and the metal shrapnel get deposited on shock shield 206. The deposited charges can cause potential rise of shock shield 206. The movement of conductive shock shield 206 causes it to come into contact with cover 202, creating an electrical connection that enables the potential acquired by shock shield to cause current to pass through the cover 202 unless prevented. The insulator disc 230 in the cover 202 prevents the direct contact between the shock shield 206 with cover 202.

Figure 6:
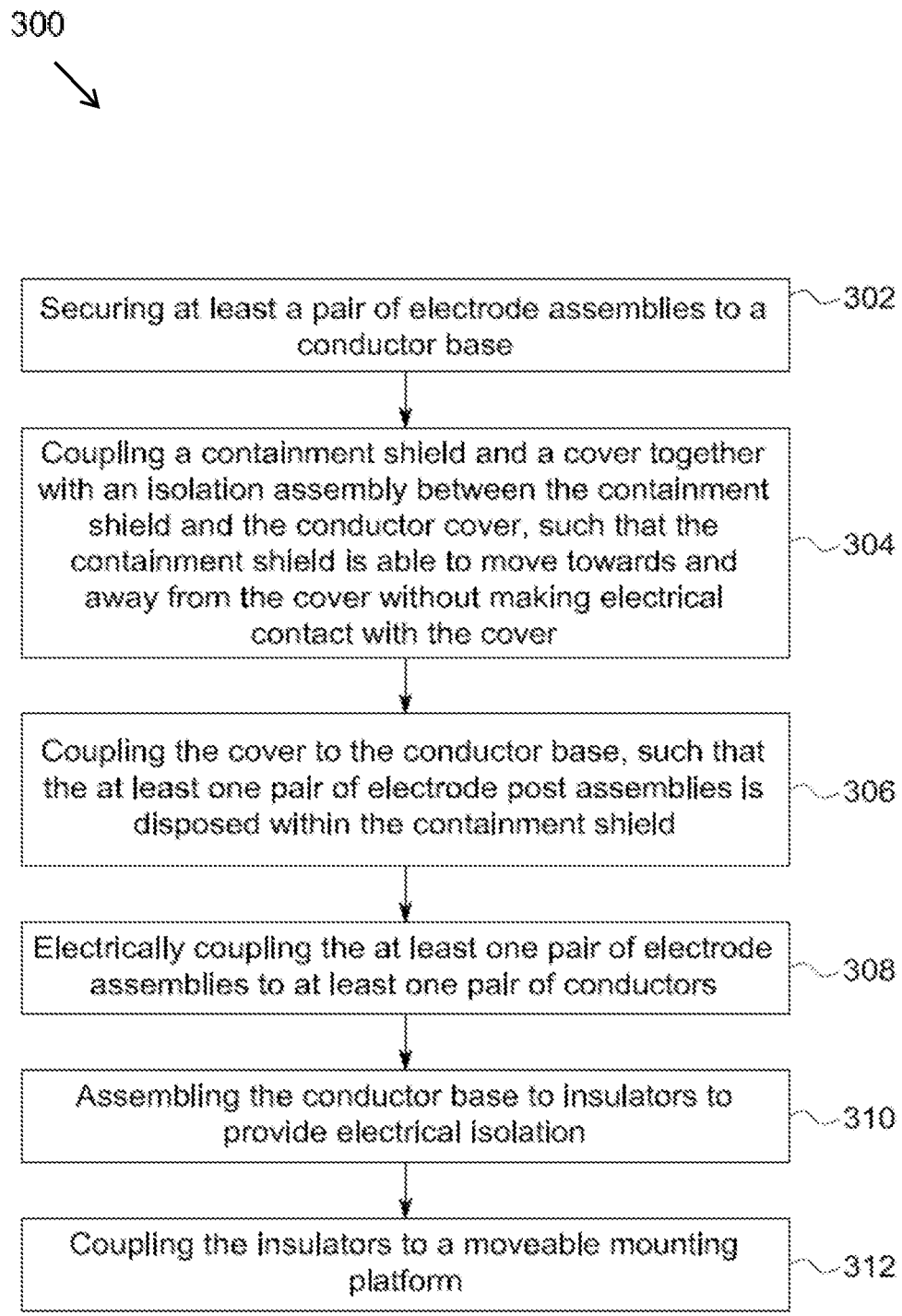
FIG. 6 is a process flow diagram of a method of assembling an arc mitigation system shown in FIG. 2.

As shown in FIG. 6, a method 300 of assembling a circuit protection device 130 includes securing 302 at least a pair of electrode assemblies to a conductor base, each electrode assembly having an electrode mounted thereon. A plasma generating device is mounted to a conductor cover. A containment shield and a cover are coupled 304 together with an isolation assembly between the containment shield and the cover, such that the containment shield is able to move towards and away from the conductor cover without making electrical contact with cover. In some implementations, the isolation assembly includes an insulating disk and a spring mechanism. The method includes coupling 306 the cover to the conductor base such that the at least one pair of electrode assemblies is disposed within the containment chamber. The at least one pair of electrode assemblies are electrically coupled 308 to the pair of conductors. The method includes the assembly 310 of the conductor base to insulators and mounting the insulators onto a moveable mounting platform to make mitigation device movable and/or rackable.

Exemplary embodiments of apparatus for use in devices for protection of power distribution equipment are described above in detail. The apparatus are not limited to the specific embodiments described herein but, rather, operation of the methods and/or components of the system and/or apparatus may be utilized independently and separately from other operations and/or components described herein. Further, the described operations and/or components may also be defined in, or used in combination with, other systems, methods, and/or apparatus, and are not limited to practice with only the systems, methods, and storage media as described herein.

Although the present invention is described in connection with an exemplary power distribution environment, embodiments of the invention are operational with numerous other general purpose or special purpose power distribution environments or configurations. The power distribution environment is not intended to suggest any limitation as to the scope of use or functionality of any aspect of the invention. Moreover, the power distribution environment should not be interpreted as having any dependency or requirement relating to any one or combination of components illustrated in the exemplary operating environment.

The order of execution or performance of the operations in the embodiments of the invention illustrated and described herein is not essential, unless otherwise specified. That is, the operations may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

When introducing elements of aspects of the invention or embodiments thereof, the articles "a," "an," "the," and "said" are intended to mean that there are one or more of the elements. The terms "comprising," including," and "having" are intended to be inclusive and mean that there may be additional elements other than the listed elements.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A circuit protection device for use with a circuit that includes at least one pair of conductors, said circuit protection device configured to generate an arc, said circuit protection device comprising:
    at least one pair of electrode assemblies, a first electrode assembly of the pair of electrode assemblies electrically coupled to a first conductor of the at least one pair of conductors, and a second electrode assembly of the pair of electrode assemblies electrically coupled to a second conductor of the at least one pair of conductors;
    a conductor base configured to support said electrode assemblies thereon;
    a cover coupled to said conductor base and defining at least one isolation chamber, wherein said at least one pair of electrode assemblies is disposed within the at least one isolation chamber;
    a containment shield moveably coupled to said cover within the isolation chamber, said containment shield defining a containment chamber configured to contain charged particles produced by the arc and said containment shield operative to move relative to said cover in response to a change in pressure produced by the arc within said containment chamber; and
    an isolation assembly coupled to at least one of said cover and said containment shield, said isolation assembly configured to prevent said cover from contacting said containment shield.

2. A circuit protection device in accordance with claim 1, further comprising:
    a movable mounting platform;
    a plurality of insulators coupled between said movable mounting platform and said conductor base.

3. A circuit protection device in accordance with claim 1, wherein said conductor base comprises an annular groove configured to receive a bottom portion of said containment shield.

4. A circuit protection device in accordance with claim 3, wherein said bottom portion of said containment shield is configured to be retained by said annular groove.

5. A circuit protection device in accordance with claim 1, wherein said isolation assembly comprises an insulator disk coupled to said cover, said insulator disk operative to prevent direct contact between said containment shield and said cover when said containment shield moves relative to said cover.

6. A circuit protection device in accordance with claim 5, wherein said isolation assembly further comprises a flexible component coupled between said insulator disk and said containment shield and configured to bias said containment shield away from said cover.

7. An electrical isolation structure for use with a circuit protection device that includes a plurality of electrode assemblies, each electrode assembly of the plurality of electrode assemblies having an electrode coupled to an electrode holder, said electrical isolation structure comprising:
    a conductor base;
    a cover coupled to said conductor base;
    a containment shield coupled to said cover and defining a containment chamber, said containment shield disposed within said cover and configured to move away from said conductor base in response to a change in pressure produced by an arc within said containment chamber; and
    an isolation assembly coupled to at least one of said cover and said containment shield, said isolation assembly configured to prevent said cover from contacting said containment shield.

8. An electrical isolation structure in accordance with claim 7, wherein said isolation assembly is configured to prevent electrical coupling between said cover and said containment shield.

9. An electrical isolation structure in accordance with claim 7, wherein said conductor base comprises an annular groove configured to receive and retain a bottom portion of said containment shield.

10. An electrical isolation structure in accordance with claim 7, wherein said isolation assembly comprises an insulator positioned between said containment shield and said cover, said insulator operative to prevent direct contact between said containment shield and said cover.

11. An electrical isolation structure in accordance with claim 7, wherein said containment shield is slidably coupled to said cover by said isolation assembly.

12. An electrical isolation structure in accordance with claim 7, further comprising:
    a mounting platform; and
    a plurality of insulators coupled between said mounting platform and said conductor base.

13. A method of assembling a circuit protection device for use with a circuit that includes a pair of conductors, wherein the circuit protection device includes a conductor base, a containment shield defining a containment chamber, a cover, a plasma generating device, and a pair of electrode assemblies each having an electrode secured thereto, said method comprising:
    securing the pair of electrode assemblies to the conductor base;
    coupling the containment shield to the cover with an isolation assembly between the containment shield and the cover such that the containment shield is moveable towards and away from a top of the cover;

coupling the cover to the conductor base such that the pair of electrode assemblies is disposed within the containment chamber; and electrically coupling the pair of electrode assemblies to the pair of conductors.

14. A method of assembling a circuit protection device in accordance with claim 13, further comprising coupling the conductor base to a mounting platform with a plurality of insulators operable to maintain electrical isolation between the conductor base and the mounting platform.

15. A method of assembling a circuit protection device in accordance with claim 13, wherein coupling the containment shield to the cover with an isolation assembly between the containment shield and the cover comprises coupling the containment shield to the cover with an isolation assembly comprising an insulator configured to maintain electrical isolation between the cover and the containment shield.

16. A method of assembling a circuit protection device in accordance with claim 13, further comprising coupling the containment shield to an annular groove in the conductor base configured to receive a bottom portion of the containment shield.

17. A method of assembling a circuit protection device in accordance with claim 16, wherein coupling the containment shield to an annular groove in the conductor base configured to receive a bottom portion of the containment shield comprises coupling the containment shield to an annular groove in the conductor base configured to receive and retain the bottom portion of the containment shield.

18. A method of assembling a circuit protection device in accordance with claim 13, wherein coupling the containment shield to the cover with an isolation assembly between the containment shield and the cover comprises coupling the containment shield to the cover with an isolation assembly comprising an insulator disk.

19. A method of assembling a circuit protection device in accordance with claim 13, wherein coupling the containment shield to the cover with an isolation assembly between the containment shield and the cover such that the containment shield is moveable towards and away from a top of the top comprises slidably coupling the containment shield to the cover with the isolation assembly such that the containment shield is moveable towards and away from a top surface of the cover.

20. A method of assembling a circuit protection device in accordance with claim 13, wherein coupling the containment shield to the cover with an isolation assembly between the containment shield and the cover further comprises coupling the containment shield to the cover with an isolation assembly comprising a spring to bias the containment shield toward the conductor base.

* * * * *